United States Patent
Wajs et al.

(10) Patent No.: US 9,774,880 B2
(45) Date of Patent: Sep. 26, 2017

(54) DEPTH-BASED VIDEO COMPRESSION

(71) Applicant: Dual Aperture International Co. Ltd., Seongnam-si (KR)

(72) Inventors: Andrew Augustine Wajs, Haarlem (NL); David D. Lee, Palo Alto, CA (US); Seungoh Ryu, Newton, MA (US); Taekun Woo, Yorba Linda, CA (US)

(73) Assignee: Dual Aperture International Co. Ltd., Seongnam-Si (KR)

( * ) Notice: Subject to any disclaimer, the term of this patent is extended or adjusted under 35 U.S.C. 154(b) by 31 days.

(21) Appl. No.: 15/150,407

(22) Filed: May 9, 2016

(65) Prior Publication Data
US 2017/0105020 A1    Apr. 13, 2017

Related U.S. Application Data

(63) Continuation of application No. 14/878,938, filed on Oct. 8, 2015, now Pat. No. 9,456,195.

(51) Int. Cl.
| | |
|---|---|
| *H04N 19/513* | (2014.01) |
| *H04N 19/172* | (2014.01) |
| *H04N 19/14* | (2014.01) |
| *H04N 19/176* | (2014.01) |
| *H04N 19/139* | (2014.01) |
| *H04N 19/187* | (2014.01) |

(52) U.S. Cl.
CPC ......... *H04N 19/513* (2014.11); *H04N 19/139* (2014.11); *H04N 19/14* (2014.11); *H04N 19/172* (2014.11); *H04N 19/176* (2014.11); *H04N 19/187* (2014.11)

(58) Field of Classification Search
CPC .... H04N 19/513; H04N 19/172; H04N 19/14; H04N 19/187; H04N 19/176
See application file for complete search history.

(56) References Cited

U.S. PATENT DOCUMENTS

| | | |
|---|---|---|
| 8,917,349 B2 | 12/2014 | Wajs |
| 9,077,916 B2 | 7/2015 | Wajs |
| 2007/0129916 A1 | 6/2007 | Muller |
| 2008/0308712 A1 | 12/2008 | Ono |
| 2009/0159799 A1 | 6/2009 | Copeland et al. |
| 2011/0069760 A1* | 3/2011 | Lee .................. H04N 5/145 375/240.16 |
| 2011/0292036 A1 | 12/2011 | Sali et al. |
| 2012/0154596 A1 | 6/2012 | Wajs |

(Continued)

OTHER PUBLICATIONS

U.S. Appl. No. 14/832,062, filed Aug. 21, 2015, Inventor Andre Wajs.

(Continued)

*Primary Examiner* — Nam Pham
(74) *Attorney, Agent, or Firm* — Fenwick & West LLP

(57) ABSTRACT

The present disclosure overcomes the limitations of the prior art by providing 3D compression (i.e., compression that also accounts for changes in depth), including 3D compression of video sequences. In one aspect, depth information is obtained by processing captured images from a multi-aperture imaging device. The availability of IR images and depth information facilitates additional processing compared to when only color images are available.

16 Claims, 6 Drawing Sheets

(56) References Cited

U.S. PATENT DOCUMENTS

| | | |
|---|---|---|
| 2012/0320054 A1 | 12/2012 | Chavez et al. |
| 2013/0021512 A1 | 1/2013 | Patuck et al. |
| 2013/0033578 A1 | 2/2013 | Wajs |
| 2013/0033579 A1 | 2/2013 | Wajs |
| 2015/0138221 A1 | 5/2015 | Choi et al. |
| 2015/0193701 A1 | 7/2015 | Sohn et al. |
| 2015/0242922 A1 | 8/2015 | Zamer |

OTHER PUBLICATIONS

United States Office Action, U.S. Appl. No. 14/878,938, Jan. 20, 2016, 20 pages.

* cited by examiner

DEPTH-BASED VIDEO COMPRESSION

CROSS-REFERENCE TO RELATED APPLICATION(S)

This application is a continuation of U.S. patent application Ser. No. 14/878,938, "Application Programming Interface For Multi-Aperture Imaging Systems," filed Oct. 8, 2015. The subject matter of all of the foregoing is incorporated herein by reference in their entirety.

BACKGROUND

1. Field of the Invention

This disclosure relates to control of multi-aperture imaging systems, for example dual-aperture cameras.

2. Description of Related Art

A dual-aperture camera has two apertures. A narrow aperture, typically at one spectral range such as infrared (IR), produces relatively sharp images over a long depth of focus. A wider aperture, typically at another spectral range such as RGB, produces sometimes blurred images for out of focus objects. The pairs of images captured using the two different apertures can be processed for different purposes, for example to generate distance information of an object, for example as described in U.S. patent application Ser. No. 13/579,568, which is incorporated herein by reference.

However, the images to be captured may vary, depending on the desired end result. Certain image capture conditions may be preferred, depending on the application. If the imaging system does some processing of its own, then certain types and amounts of processing may also be preferred, depending on the application. In addition, certain types of output may also be preferred. Depending on the available bandwidth, some sorts of compression may be desirable. Since different applications may have different requirements, it would be useful to control the image capture, processing and output in a convenient manner.

SUMMARY

The present disclosure overcomes the limitations of the prior art by providing 3D compression (i.e., compression that is based in part on depth information), including 3D compression of video sequences.

In one aspect, depth information is obtained by processing captured images from a multi-aperture imaging device. The availability of IR images and depth information facilitates additional processing compared to when only visible images are available. For example, depth information can be used to facilitate the 3D compression of video sequences. In one approach, macroblocks in different frames are scaled according to their depth, with the 3D compression based on the scaled macroblocks. Two-dimensional and/or three dimensional motion vectors may also be used to facilitate compression.

In another aspect, the depth information itself is also compressed. For example, depth information may be included only for edges, and interpolated for non-edge areas. Alternately, depth information may be included only for referenced frames, and interpolated (using motion vectors) for in-between frames. Lossy compression may also be used.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
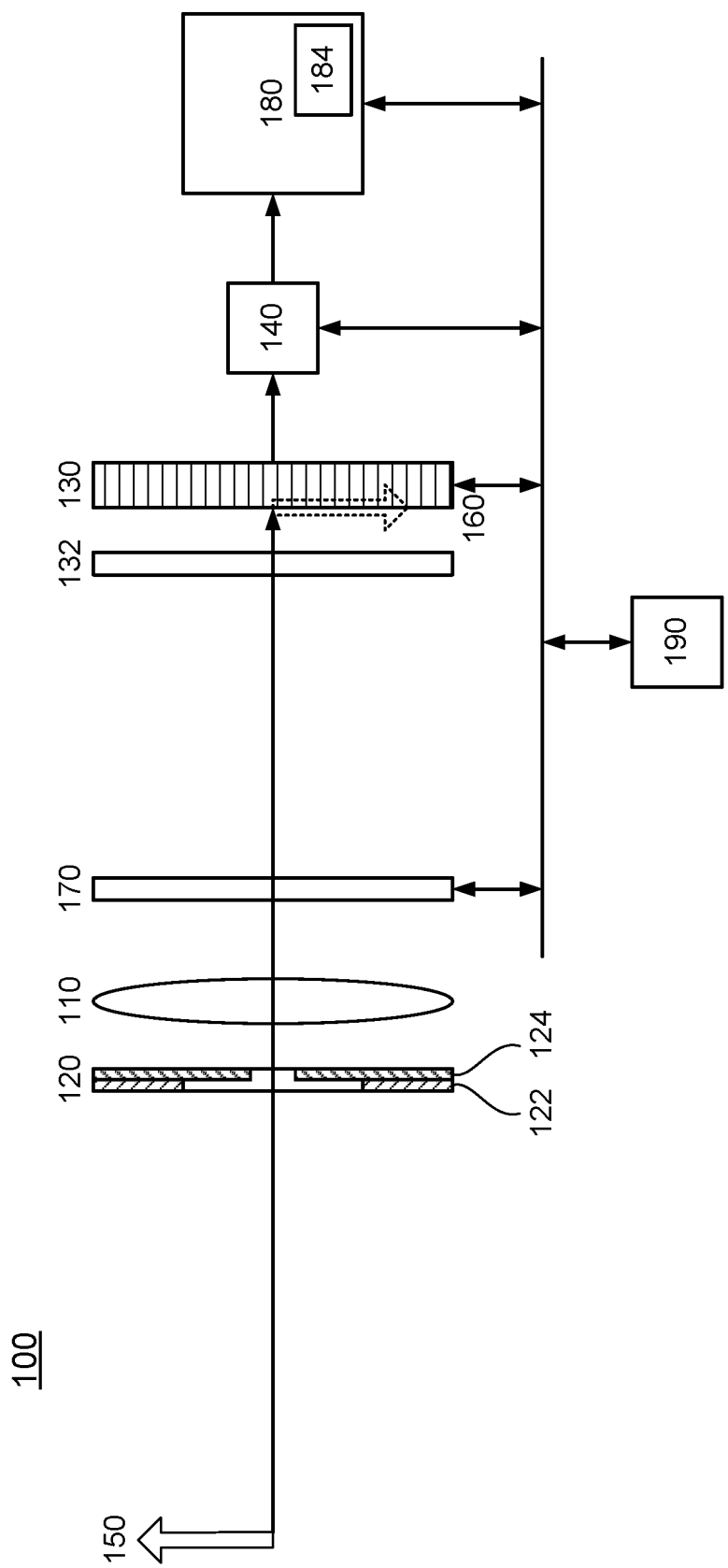
FIG. 1 is a block diagram of a multi-aperture, shared sensor imaging system according to one embodiment of the invention.

FIG. 1 is a block diagram of a multi-aperture, shared sensor imaging system 100 according to one embodiment of the invention. The imaging system may be part of a digital camera or integrated in a mobile phone, a webcam, a biometric sensor, image scanner or any other multimedia device requiring image-capturing functionality. The system depicted in FIG. 1 includes imaging optics 110 (e.g., a lens and/or mirror system), a multi-aperture system 120 and an image sensor 130. The imaging optics 110 images objects 150 from a scene onto the image sensor. In FIG. 1, the object 150 is in focus, so that the corresponding image 160 is located at the plane of the sensor 130. As described below, this will not always be the case. Objects that are located at other depths will be out of focus at the image sensor 130.

The multi-aperture system 120 includes at least two apertures, shown in FIG. 1 as apertures 122 and 124. In this example, aperture 122 is the aperture that limits the propagation of visible light, and aperture 124 limits the propagation of infrared or other non-visible light. In this example, the two apertures 122, 124 are placed together but they could also be separated. This type of multi-aperture system 120 may be implemented by wavelength-selective optical components, such as wavelength filters. As used in this disclosure, terms such as "light" "optics" and "optical" are not meant to be limited to the visible part of the electromagnetic spectrum but to also include other parts of the electromagnetic spectrum where imaging may occur, including wavelengths that are shorter than visible (e.g., ultraviolet) and wavelengths that are longer than visible (e.g., infrared).

The sensor 130 detects both the visible image corresponding to aperture 122 and the infrared image corresponding to aperture 124. In effect, there are two imaging systems that share a single sensor array 130: a visible imaging system using optics 110, aperture 122 and sensor 130; and an infrared imaging system using optics 110, aperture 124 and sensor 130. The imaging optics 110 in this example is fully shared by the two imaging systems, but this is not required. In addition, the two imaging systems do not have to be visible and infrared. They could be other spectral combinations: red and green, or infrared and white (i.e., visible but without color), for example.

The exposure of the image sensor 130 to electromagnetic radiation is typically controlled by a shutter 170 and the apertures of the multi-aperture system 120. When the shutter 170 is opened, the aperture system controls the amount of light and the degree of collimation of the light exposing the image sensor 130. The shutter 170 may be a mechanical shutter or, alternatively, the shutter may be an electronic shutter integrated in the image sensor. The image sensor 130 typically includes rows and columns of photosensitive sites (pixels) forming a two dimensional pixel array. The image sensor may be a CMOS (complementary metal oxide semiconductor) active pixel sensor or a CCD (charge coupled device) image sensor. Alternatively, the image sensor may relate to other Si (e.g. a-Si), III-V (e.g. GaAs) or conductive polymer based image sensor structures.

When the light is projected by the imaging optics 110 onto the image sensor 130, each pixel produces an electrical signal, which is indicative of the electromagnetic radiation (energy) incident on that pixel. In order to obtain color information and to separate the color components of an image which is projected onto the imaging plane of the image sensor, typically a color filter array 132 is interposed between the imaging optics 110 and the image sensor 130. The color filter array 132 may be integrated with the image sensor 130 such that each pixel of the image sensor has a corresponding pixel filter. Each color filter is adapted to pass light of a predetermined color band onto the pixel. Usually a combination of red, green and blue (RGB) filters is used. However other filter schemes are also possible, e.g. CYGM (cyan, yellow, green, magenta), RGBE (red, green, blue, emerald), etc. Alternately, the image sensor may have a stacked design where red, green and blue sensor elements are stacked on top of each other rather than relying on individual pixel filters.

Each pixel of the exposed image sensor 130 produces an electrical signal proportional to the electromagnetic radiation passed through the color filter 132 associated with the pixel. The array of pixels thus generates image data (a frame) representing the spatial distribution of the electromagnetic energy (radiation) passed through the color filter array 132. The signals received from the pixels may be amplified using one or more on-chip amplifiers. In one embodiment, each color channel of the image sensor may be amplified using a separate amplifier, thereby allowing to separately control the ISO speed for different colors.

Further, pixel signals may be sampled, quantized and transformed into words of a digital format using one or more analog to digital (A/D) converters 140, which may be integrated on the chip of the image sensor 130. The digitized image data are processed by a processor 180, such as a digital signal processor (DSP) coupled to the image sensor, which is configured to perform well known signal processing functions such as interpolation, filtering, white balance, brightness correction, and/or data compression techniques (e.g. MPEG or JPEG type techniques).

The processor 180 may include signal processing functions 184 for obtaining depth information associated with an image captured by the multi-aperture imaging system. These signal processing functions may provide a multi-aperture imaging system with extended imaging functionality including variable depth of focus, focus control and stereoscopic 3D image viewing capabilities. The details and the advantages associated with these signal processing functions will be discussed hereunder in more detail.

The processor 180 may also be coupled to additional compute resources, such as additional processors, storage memory for storing captured images and program memory for storing software programs. A controller 190 may also be used to control and coordinate operation of the components in imaging system 100. Functions described as performed by the processor 180 may instead be allocated among the processor 180, the controller 190 and additional compute resources.

As described above, the sensitivity of the imaging system 100 is extended by using infrared imaging functionality. To that end, the imaging optics 110 may be configured to allow both visible light and infrared light or at least part of the infrared spectrum to enter the imaging system. Filters located at the entrance aperture of the imaging optics 110 are configured to allow at least part of the infrared spectrum to enter the imaging system. In particular, imaging system 100 typically would not use infrared blocking filters, usually referred to as hot-mirror filters, which are used in conventional color imaging cameras for blocking infrared light from entering the camera. Hence, the light entering the multi-aperture imaging system may include both visible light and infrared light, thereby allowing extension of the photo-response of the image sensor to the infrared spectrum. In cases where the multi-aperture imaging system is based on spectral combinations other than visible and infrared, corresponding wavelength filters would be used.

Figure 2A:
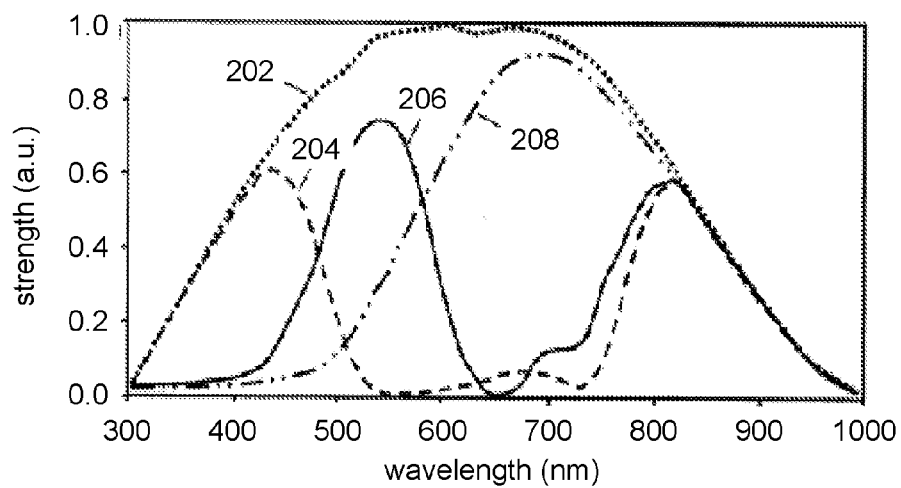
FIG. 2A is a graph illustrating the spectral responses of a digital camera.
Figure 2B:
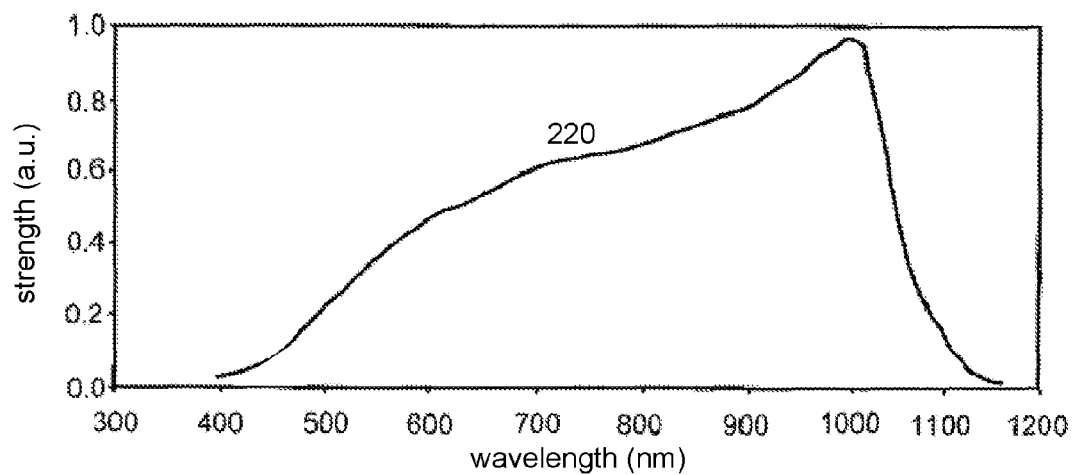
FIG. 2B is a graph illustrating the spectral sensitivity of silicon.

FIGS. 2A and 2B are graphs showing the spectral responses of a digital camera. In FIG. 2A, curve 202 represents a typical color response of a digital camera without an infrared blocking filter (hot mirror filter). As can be seen, some infrared light passes through the color pixel filters. FIG. 2A shows the photo-responses of a conventional blue pixel filter 204, green pixel filter 206 and red pixel filter 208. The color pixel filters, in particular the red pixel filter, may transmit infrared light so that a part of the pixel signal may be attributed to the infrared. FIG. 2B depicts the response 220 of silicon (i.e. the main semiconductor component of an image sensor used in digital cameras). The sensitivity of a silicon image sensor to infrared radiation is approximately four times higher than its sensitivity to visible light.

In order to take advantage of the spectral sensitivity provided by the image sensor as illustrated by FIGS. 2A and 2B, the image sensor 130 in the imaging system in FIG. 1 may be a conventional image sensor. In a conventional RGB sensor, the infrared light is mainly sensed by the red pixels. In that case, the DSP 180 may process the red pixel signals in order to extract the low-noise infrared information. This process will be described below in more detail. Alternatively, the image sensor may be especially configured for imaging at least part of the infrared spectrum. The image sensor may include, for example, one or more infrared (I) pixels in addition to the color pixels, thereby allowing the image sensor to produce a RGB color image and a relatively low-noise infrared image.

An infrared pixel may be realized by covering a pixel with a filter material, which substantially blocks visible light and substantially transmits infrared light, preferably infrared light within the range of approximately 700 through 1100 nm. The infrared transmissive pixel filter may be provided in an infrared/color filter array (ICFA) may be realized using well known filter materials having a high transmittance for wavelengths in the infrared band of the spectrum, for example a black polyimide material sold by Brewer Science under the trademark "DARC 400".

Such filters are described in more detail in US2009/0159799, "Color infrared light sensor, camera and method for capturing images," which is incorporated herein by reference. In one design, an ICFA contain blocks of pixels, e.g. a block of 2×2 pixels, where each block comprises a red, green, blue and infrared pixel. When exposed, such an ICFA image sensor produces a raw mosaic image that includes both RGB color information and infrared information. After processing the raw mosaic image, a RGB color image and an infrared image may be obtained. The sensitivity of such an ICFA image sensor to infrared light may be increased by increasing the number of infrared pixels in a block. In one configuration (not shown), the image sensor filter array uses blocks of sixteen pixels, with four color pixels (RGGB) and twelve infrared pixels.

Instead of an ICFA image sensor (where color pixels are implemented by using color filters for individual sensor pixels), in a different approach, the image sensor 130 may use an architecture where each photo-site includes a number of stacked photodiodes. Preferably, the stack contains four stacked photodiodes responsive to the primary colors RGB and infrared, respectively. These stacked photodiodes may be integrated into the silicon substrate of the image sensor.

The multi-aperture system, e.g. a multi-aperture diaphragm, may be used to improve the depth of field (DOF) or other depth aspects of the camera. The DOF determines the range of distances from the camera that are in focus when the image is captured. Within this range the object is acceptably sharp. For moderate to large distances and a given image format, DOF is determined by the focal length of the imaging optics N, the f-number associated with the lens opening (the aperture), and/or the object-to-camera distance s. The wider the aperture (the more light received) the more limited the DOF. DOF aspects of a multi-aperture imaging system are illustrated in FIG. 3.

Figure 3A:
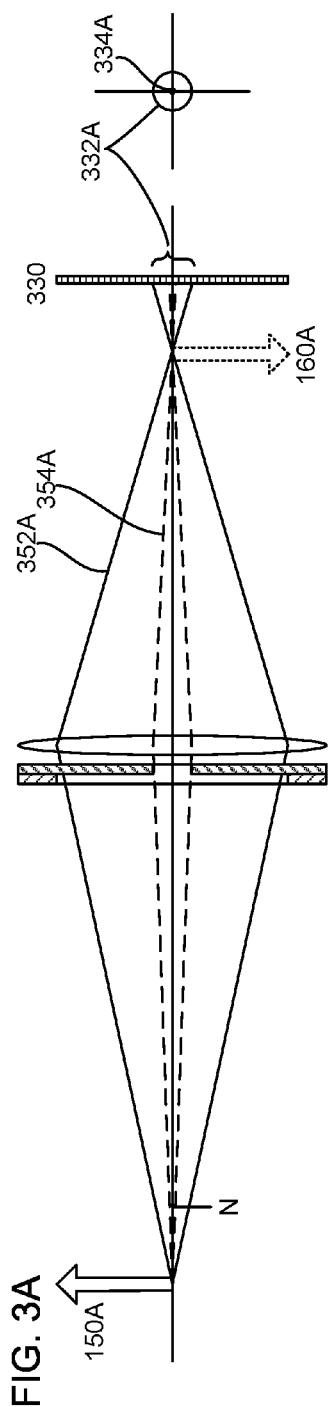
FIGS. 3A-3C depict operation of a multi-aperture imaging system according to one embodiment of the invention.
Figure 3B:
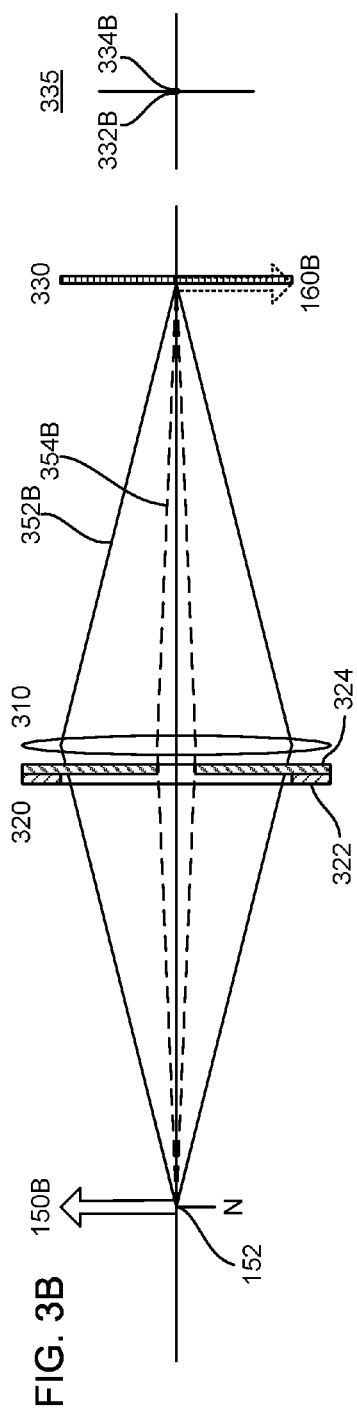

Consider first FIG. 3B, which shows the imaging of an object 150 onto the image sensor 330. Visible and infrared light may enter the imaging system via the multi-aperture system 320. In one embodiment, the multi-aperture system 320 may be a filter-coated transparent substrate. One filter coating 324 may have a central circular hole of diameter D1. The filter coating 324 transmits visible light and reflects and/or absorbs infrared light. An opaque cover 322 has a larger circular opening with a diameter D2. The cover 322 does not transmit either visible or infrared light. It may be a thin-film coating which reflects both infrared and visible light or, alternatively, the cover may be part of an opaque holder for holding and positioning the substrate in the optical system. This way, the multi-aperture system 320 acts as a circular aperture of diameter D2 for visible light and as a circular aperture of smaller diameter D1 for infrared light. The visible light system has a larger aperture and faster f-number than the infrared light system. Visible and infrared light passing the aperture system are projected by the imaging optics 310 onto the image sensor 330.

The pixels of the image sensor may thus receive a wider-aperture optical image signal 352B for visible light, overlaying a second narrower-aperture optical image signal 354B for infrared light. The wider-aperture visible image signal 352B will have a shorter DOF, while the narrower-aperture infrared image signal 354 will have a longer DOF. In FIG. 3B, the object 150B is located at the plane of focus N, so that the corresponding image 160B is in focus at the image sensor 330.

Objects 150 close to the plane of focus N of the lens are projected onto the image sensor plane 330 with relatively small defocus blur. Objects away from the plane of focus N are projected onto image planes that are in front of or behind the image sensor 330. Thus, the image captured by the image sensor 330 is blurred. Because the visible light 352B has a faster f-number than the infrared light 354B, the visible image will blur more quickly than the infrared image as the object 150 moves away from the plane of focus N. This is shown by FIGS. 3A and 3C and by the blur diagrams at the right of each figure.

Most of FIG. 3B shows the propagation of rays from object 150B to the image sensor 330. The righthand side of FIG. 3B also includes a blur diagram 335, which shows the blurs resulting from imaging of visible light and of infrared light from an on-axis point 152 of the object. In FIG. 3B, the on-axis point 152 produces a visible blur 332B that is relatively small and also produces an infrared blur 334B that is also relatively small. That is because, in FIG. 3B, the object is in focus.

Figure 3C:
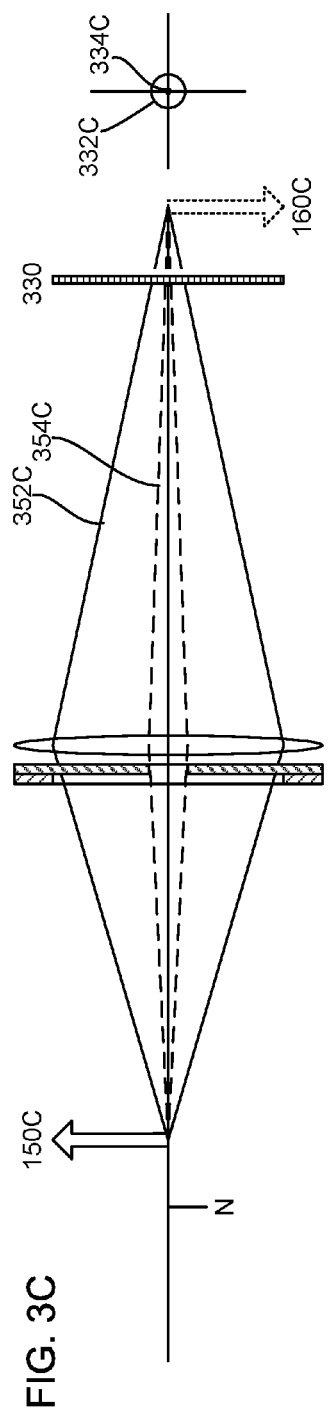

FIGS. 3A and 3C show the effects of defocus. In FIG. 3A, the object 150A is located to one side of the nominal plane of focus N. As a result, the corresponding image 160A is formed at a location in front of the image sensor 330. The light travels the additional distance to the image sensor 330, thus producing larger blur spots than in FIG. 3B. Because the visible light 352A is a faster f-number, it diverges more quickly and produces a larger blur spot 332A. The infrared light 354 is a slower f-number, so it produces a blur spot 334A that is not much larger than in FIG. 3B. If the f-number is slow enough, the infrared blur spot may be assumed to be constant size across the range of depths that are of interest.

FIG. 3C shows the same effect, but in the opposite direction. Here, the object 150C produces an image 160C that would fall behind the image sensor 330. The image sensor 330 captures the light before it reaches the actual image plane, resulting in blurring. The visible blur spot 332C is larger due to the faster f-number. The infrared blur spot 334C grows more slowly with defocus, due to the slower f-number. The DSP 180 may be configured to process the captured color and infrared images.

Figure 4:
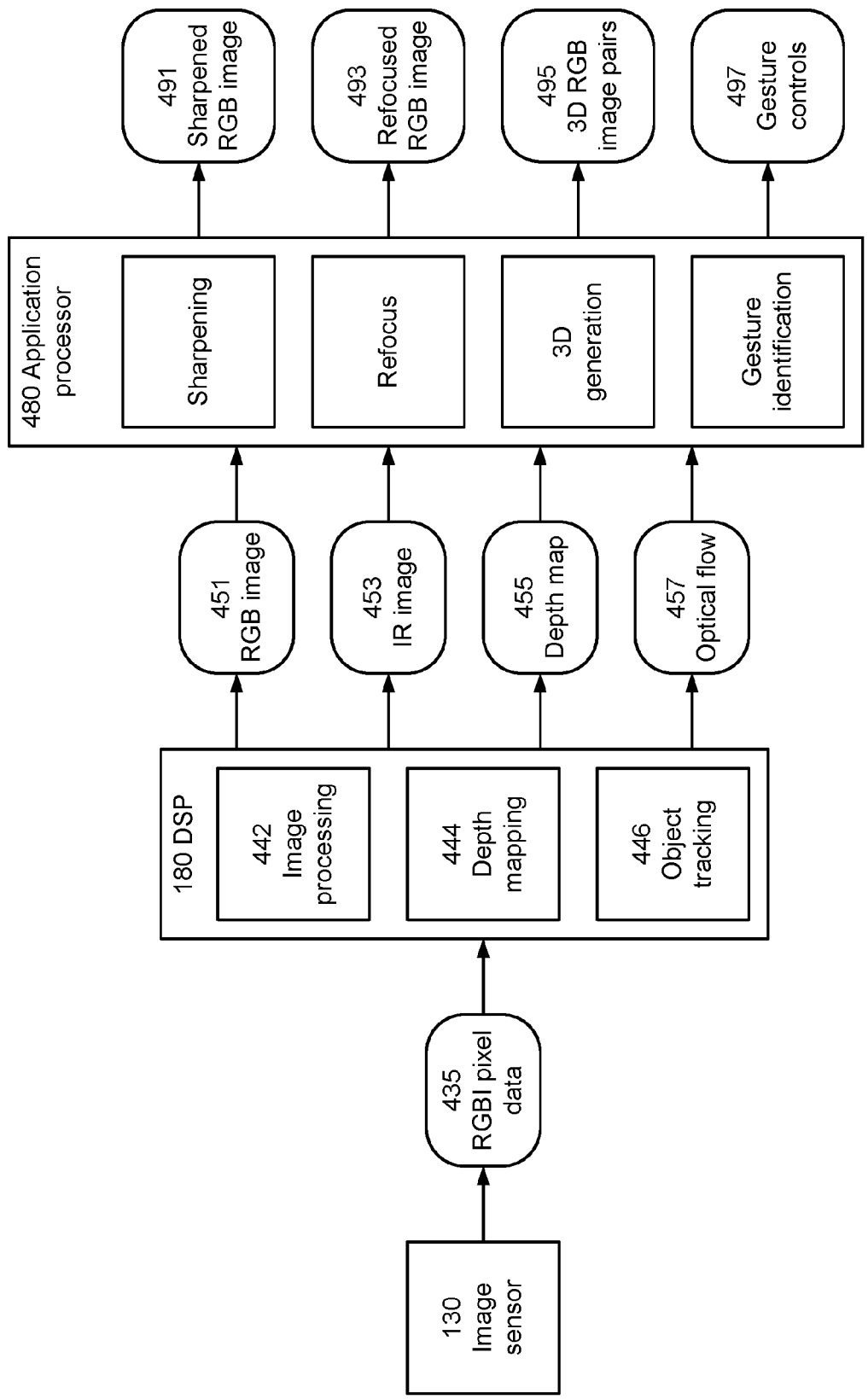
FIG. 4 is a block diagram of a data flow for a multi-aperture imaging system according to one embodiment of the invention.

FIG. 4 is a block diagram illustrating one possible data flow for a multi-aperture imaging system. From left to right and referring also to FIG. 1, the image sensor 130 captures raw image data 435, for example R(ed), G(reen), B(lue) and I(nfrared) spectral channels.

The DSP 180 does some initial processing. In this example, this initial processing includes image processing 442, depth processing 444 and object tracking 446. The image processing 442 produces a visible image 451, which is more sensitive to defocus due to the larger visible aperture 122, and an infrared image 453, which is less sensitive to defocus due to the smaller infrared aperture 124. The depth processing 444 produces a depth map 455 of the scene. The depth map can be produced based on the different sensitivities to defocus between the visible and IR spectral channels, as illustrated in FIG. 3. The object tracking 446 produces an optical flow 457, which tracks objects from frame to frame.

These results can be further processed, which in FIG. 4 is performed by an application processor 480 (not shown in FIG. 1). Some examples of further processing including sharpening 491 the visible image and refocusing 493 the visible image, by using additional information in the infrared image 453 and possibly also the depth map 455 and optical flow 457. The visible and color images can also be processed to generate 3D image pairs 495. A final example is the identification of gestures 497.

FIG. 4 shows a division of processing between a DSP 180 and an application processor 480. This is just an example. The different processing steps may be divided in other ways among other devices. Not all the processing steps may be implemented, and processing steps not shown may also be included.

In some applications, processing effectively allows the multi-aperture imaging system to have a wide aperture for effective operation in lower light situations, while at the same time to have a greater depth of field (DOF) resulting in sharper pictures. Further, the method effectively increase the optical performance of lenses, reducing the cost of a lens required to achieve the same performance. The multi-aperture imaging system thus allows a simple mobile phone camera with a typical f-number of 2 (e.g. focal length of 3 mm and a diameter of 1.5 mm) to improve its DOF via a second aperture with a f-number varying e.g. between 6 for a diameter of 0.5 mm up to 15 or more for diameters equal to or less than 0.2 mm. The f-number is defined as the ratio of the focal length f and the effective diameter of the aperture. Preferable implementations include optical systems with an f-number for the visible aperture of approximately 2 to 4 for increasing the sharpness of near objects, in combination with an f-number for the infrared aperture of approximately 16 to 22 for increasing the sharpness of distance objects.

Further examples of improvements in the DOF and the ISO speed provided by a multi-aperture imaging system are described in more detail in U.S. application Ser. No. 13/144,499, "Improving the depth of field in an imaging system"; U.S. application Ser. No. 13/392,101, "Reducing noise in a color image"; U.S. application Ser. No. 13/579,568, "Processing multi-aperture image data"; U.S. application Ser. No. 13/579,569, "Processing multi-aperture image data"; and U.S. application Ser. No. 13/810,227, "Flash system for multi-aperture imaging." All of the foregoing are incorporated by reference herein in their entirety.

Examples of processing functions, including other variations for calculating image sharpness and/or depth, are described in U.S. application Ser. No. 13/144,499, "Improving the depth of field in an imaging system"; U.S. application Ser. No. 13/392,101, "Reducing noise in a color image"; U.S. application Ser. No. 13/579,568, "Processing multi-aperture image data"; U.S. application Ser. No. 13/579,569, "Processing multi-aperture image data"; U.S. application Ser. No. 13/810,227, "Flash system for multi-aperture imaging"; and U.S. application Ser. No. 14/832,062, "Multi-aperture depth map using blur kernels and down-sampling." All of the foregoing are incorporated by reference herein in their entirety.

Figure 5B:
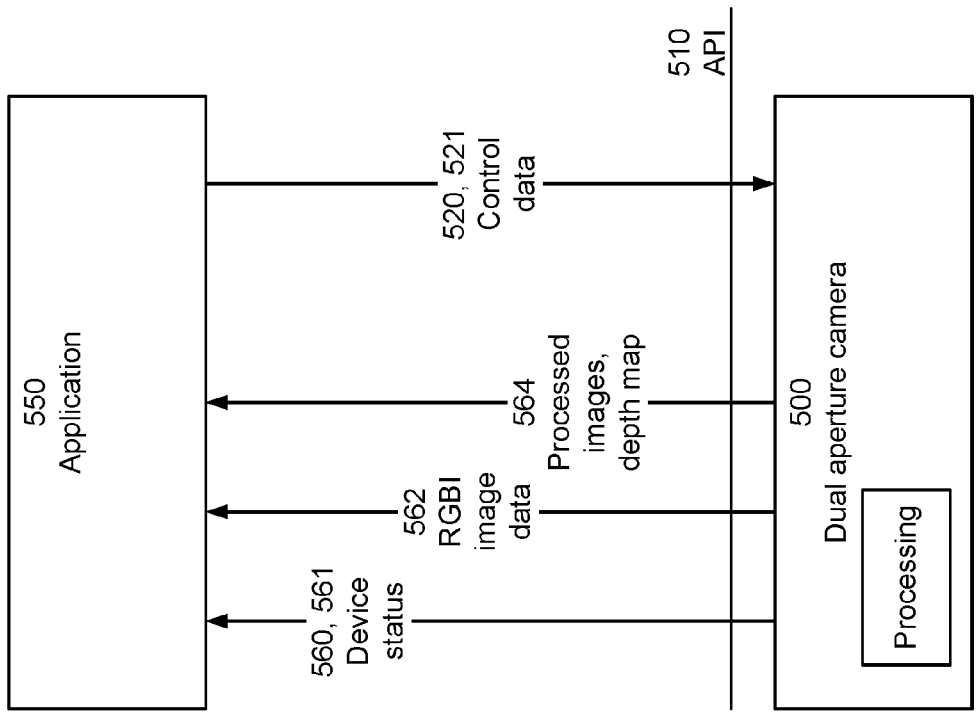
FIGS. 5A-5B are block diagrams illustrating API for use with a multi-aperture imaging system.
Figure 5A:
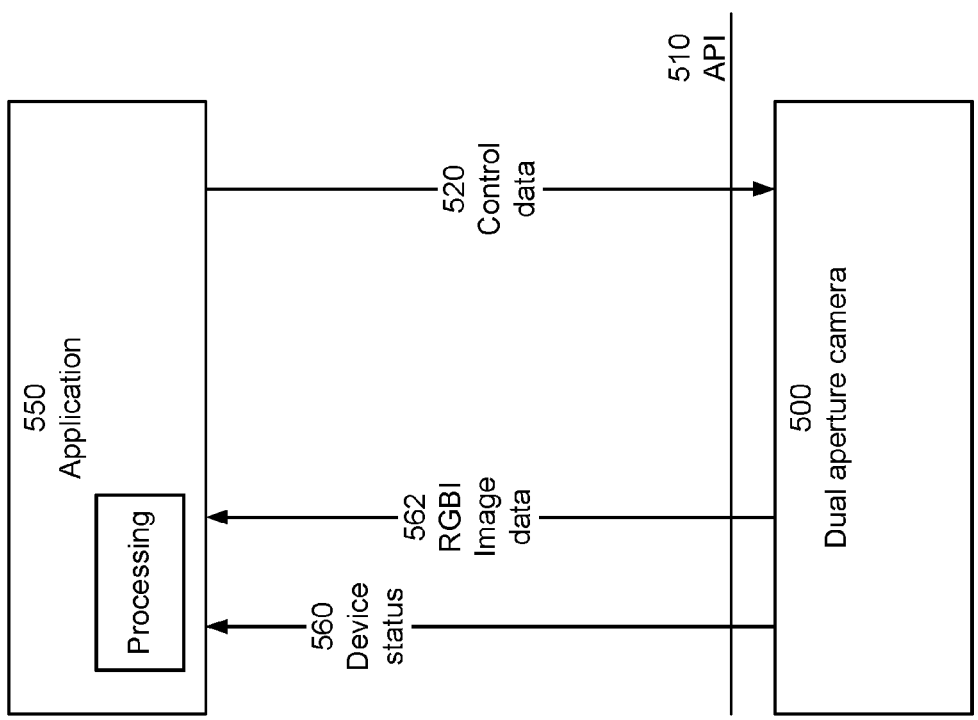

Due to the large variety of processing that may be desirable (and even further processing may be performed by higher application layers), it is useful to provide a standardized approach to specify the image capture and processing performed by the multi-aperture imaging system. In FIGS. 5A-5B, processing is divided between a multi-aperture imaging device 500 and application software 550. For example, the multi-aperture imaging device 500 may be a handheld camera, camera in a cell phone or similar form factor. In the cell phone example, the application software 550 may be any of many different applications intended to run on the cell phone. The interface between the device 500 and the application software 550 is defined by an API 510.

In FIG. 5A, the device 500 is more basic. The sensor captures raw image data and the device outputs RGB and I images 562 and associated metadata. The application layer 550 does more of the processing, including possibly sharpening images, refocusing images, generating depth information, object tracking, 3D image generation and gesture identification. The API 510 supports the transmission of basic control data 520 from the application 550 to the device 500, allowing the application to specify image capture parameters such as flash, exposure, resolution, frame rate, etc. The API 510 also supports the transmission of image data 562 from the device 500 to the application 550. It also supports the reporting of the device status or device parameters 560.

In FIG. 5B, the device 500 includes some of the processing. In this example, depth processing and some basic image enhancement is performed by the device 500. The API 510 supports the basic functions shown in FIG. 5A (basic control data 520, RGBI image data 562 and device status 560). However, the API 510 also supports extensions relating to the additional functions. For example, the API 510 allows the application 550 to pass to the device 500 more advanced parameters 521 for depth processing or for image enhancement. In the reverse direction, the API specifies the transmission of depth information or other processed image data 564. It also supports the transmission of metadata and the reporting of status 561 related to these additional functions.

API functions can be divided into different categories, for example: image capture and camera control, image enhancement and control, depth measurement, and object tracking. For basic image capture, the API can support specifying different image capture parameters, such as resolution of the captured image or binning settings for the image capture, frame rate of the image capture, number of frames to be captured, which spectral channels to capture, and/or the duration of the image capture.

The API can also support specifying flash and exposure. Flash options can include firing the flash, not firing the flash, partially firing the flash, and flash continuously on. Exposure options can include turning on auto exposure. Other image capture parameters include activating noise reduction, activating pre-image capture sequences or activating preset image capture configurations. These options could also be specified independently for visible and IR images or even individually for each spectral channel.

More generally, image capture parameters can be specified for all image capture, separately for visible and IR images, and/or separately for each spectral channel (e.g., different parameters for R, G, and B channels). Control of individual spectral channels provides more flexibility. For example, controlling the exposure levels for individual color channels can be used to achieve better white balance during the image capture. This can improve the overall noise of the image in certain lighting conditions. As another example, the IR exposure level can be adjusted according to different lighting conditions or different aperture conditions. This can be important in lighting conditions where the IR level is very low.

Being able to specify which spectral channels should be captured also provides additional flexibility. Some depth applications only require two channels—one of the larger aperture R, G, B visible channels and the smaller aperture IR channel. If only two of the four channels are read to make the depth measurement, then the frame rate can be doubled or the same frame rate could be maintained but with lower power consumption.

Figure 6:
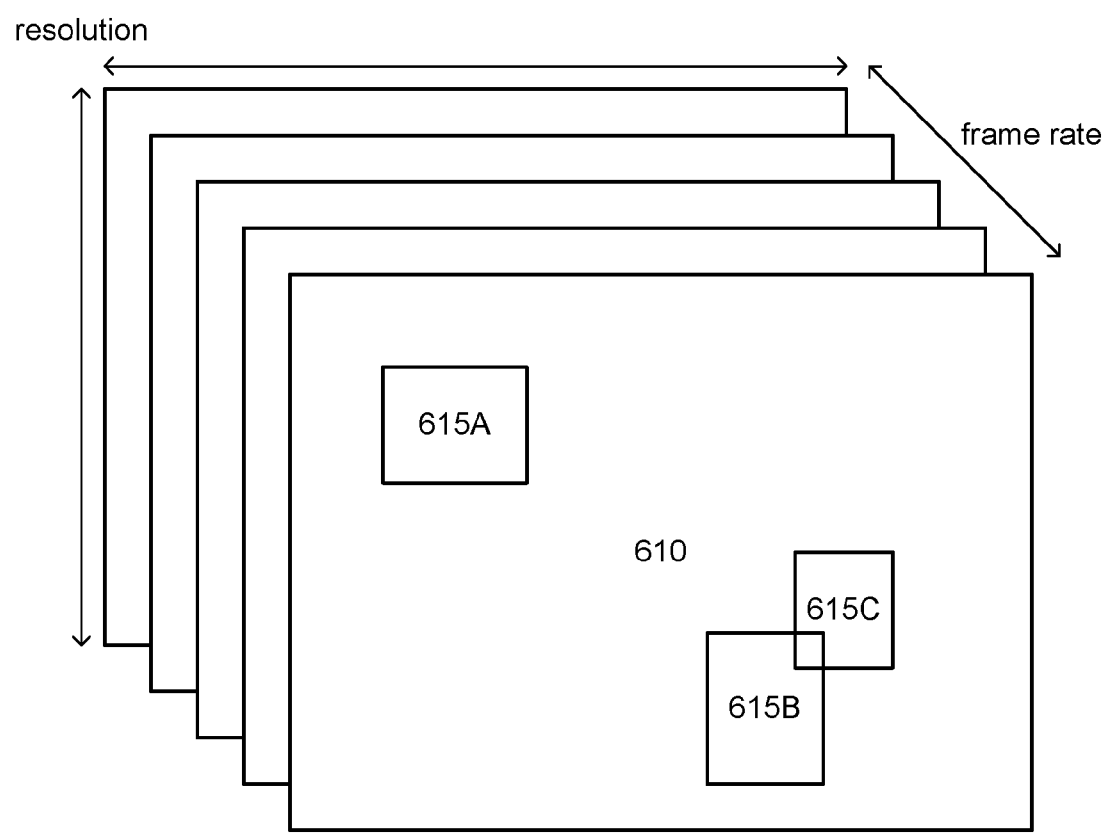
FIG. 6 is a diagram illustrating subframes within a frame.

The API supports parameters that specify the image capture conditions for frames, but the API can also support specifying different parameters for subframes within a frame. FIG. 6 is a diagram illustrating subframes 615A-C within a frame 610. In this example, the API specifies the number of rectangular subframes (three) and the location of each subframe 615 is defined by the (x,y) coordinates of its opposite corners. The API supports specifying different image capture parameters for the subframes.

For example, if one subframe 615A is of more interest, the API may specify to capture image data within that subframe at a higher resolution, at a faster frame rate, with more spectral channels, with more post-processing, etc. The opposite may also be true. With a flexible API, the image capture parameters can be set differently for each subframe, and also between the subframes and the background frame area (i.e., the area outside the subframes).

In fact, the background may not be captured at all. For example, maybe a single subframe is specified and image data is captured only within that subframe. Capturing less than the entire frame can reduce the power consumption by shutting down or placing into standby pixels of the image sensor that are not being used and the corresponding circuitry. In addition, the sensor need not be driven at the maximum clock rate. Alternately, a smaller subframe can be captured at a faster frame rate. Outputting captured image data is often a bottleneck. By reducing the amount of image data to be output, the read out time can be shortened and the frame rate then increased.

Similar tradeoffs occur by specifying different image capture parameters for different subframes. Lower resolution, slower frame rate and fewer spectral channels for a subframe will all contribute to less image data collected for that subframe. That, in turn, can be used to reduce power consumption and/or allow higher quality image capture in other subframes.

For example, in a surveillance application, more attention may be paid to certain areas than others—entrances and exits for one. Through the API, the surveillance application can define subframes for these hot spots, and these subframes can be captured at higher resolution, faster frame rates, etc. so that individuals may be identified from the captured images if necessary. Outside these subframes, the surveillance application may be limited to motion detection, with correspondingly lower requirements on image capture.

As another example, an application may perform depth estimation based on the captured images. However, the image resolution required to achieve a certain depth resolution may vary as a function of the depth. Perhaps objects farther away require higher resolution images compared to closer objects. Through the API, the depth processing application can define which subframes correspond to farther depths and then specify higher resolution image capture for these subframes.

In both of the above examples, the subframes may be defined either statically or dynamically. For the surveillance example, a permanent doorway may be statically identified as a subframe of interest. Alternately, subframes drawn for individuals may be dynamically defined by motion tracking of the individual. A similar situation exists for the depth processing. Certain areas may be known or assumed to be at certain depths, but other subframes may be identified based on depth estimation from previous frames or for adjacent areas.

Beyond basic image capture, the API may also support specifying more complex processing. Examples include optical flow, depth processing, image enhancement, object tracking, 3D image generation and display.

Optical flow is used to identify regions of the image that are in motion. This can be used when tracking objects in a video sequence to identify regions of interest and to reduce the overall processing requirements. For example, when processing two frames, detecting what has moved between two frames can be used to reduce depth map processing. Firstly, for those regions where no motion has occurred, the depth in the second frame can be derived from the depth calculated in the first frame. An alternative is to focus only on those regions where movement has occurred and only measure depth in regions of movement. This is particularly useful for gesture tracking.

Optical flow can be controlled by applications via the API, and the results of optical flow analysis can be transmitted to applications via the API. For example, through the API, the application might specify certain subframes for tracking. The optical flow can also be set so that the motion is detected for a fraction of the frames and not for all frames. Both of these can reduce the overall computational requirements and power consumption.

One approach to reduce the frame count for which optical flow is calculated, is to discard frames, for example to discard 4 out of 5 frames. In one approach, the comparison in detecting motion is done between frames 1 and 5, with frames 2, 3, and 4 being discarded. Another alternative is to compare between two adjacent frames and discard the others. In this case comparison is made between frames 1 and 2, with frames 3, 4 and 5 being discarded. With respect to subframes, the region of interest may be determined by first computing the optical flow for the full frame. However, the next calculation of optical flow is performed only in the regions where motion was detected in the first frame. The API can be designed to support these variations, for example how many frames to discard, which frames to use for optical flow, whether to track subframes, etc.

Control of depth processing can be used to reduce power consumption by reducing the amount of computation required. Depth processing can be specified through the API by specifying depth map calculation only for subframes of the image. The subframes of interest may be selected based on motion, past depth information and/or edge information, for example. The resolution of the image may also be scaled to reduce computation. Higher level functions can also be supported by the API. For example, the API might include a command that returns all the pixels at a specified depth level, or all the pixels at the depth that is closest to the camera, or all the pixels at the depth that is farthest from the camera (or all the pixels within a certain subframe). Alternately, rather than returning all the pixels, the commands might return a set of bounding boxes for the pixels at the depth level of interest.

For image enhancement, the API can support control of generation of an enhanced color image from the raw R, G, B, I spectral channels, for example. Refocusing and re-exposure can also be controlled by setting parameters such as the number of depth levels, the number of focus planes, and the blur level and exposure level. These can be set differently for different depth levels. For example, through the API, the application might specify sharp images at a depth of 4 m but more blurred images at a depth of 6 m. Similarly an object in the image can be emphasized by either making everything at the depth brighter or everything at other depths less bright.

Object tracking can also be specified through the API. A supported command could allow the application to specify an object to be tracked, in addition to parameters for the tracking. The object could be identified by specifying a rectangular region in a particular frame. That object would then be tracked through subsequent frames. Tracking parameters could include the duration of tracking (tracking for N frames), and how frequently to process frames for tracking (e.g., process every frame, every kth frame, etc.). The command returns the rectangular region in each frame that best corresponds to the originally identified object. Techniques similar to those used for motion estimation vectors in video compression may be used. Depth information may be used to determine object motion, and the command may return depth information for the determined objects in subsequent frames.

Depth information can be used to generate 3D images, for example left and right eye pairs of images. The API can be used to specify parameters for 3D image generation. In addition to more general parameters such as resolution, frame rate and exposure, these may also include parameters that are more specific to 3D. Examples include depth offset, which controls the shift between the two images as a function of depth. Negative values specify that the 3D image should be positioned behind the screen while positive values specify that the 3D image should be positioned in front of the screen. Another example is parallax, which specifies the amount of divergence between left and right eye views.

If the multi-aperture imaging device itself has a display, such as a viewfinder on a camera or a screen on a mobile device, the API can include parameters to control use of the display. One example is the control of whether to display RGB images, IR images, depth maps, or a combination of these.

In addition to allowing control of the multi-aperture imaging device, the API also specifies the format for data output from the multi-aperture imaging device. Examples of output data can include some or all of the following. All of these cases can further include metadata:
  Raw image—This includes the pixel data from the camera before processing. This can include the following components:
    Raw Image—array the size of the sensor.
  Processed image—Can be displayed. This can include the following components:
    RGB Image (TIFF, BMP or JPEG format)
    IR Image (TIFF, BMP or JPEG format)
    Depth Map (array of depth values)—for edges only or regularized
  Adjustable image—Intended for further processing. This can include the following components:
    RGB Image (TIFF, BMP or JPEG format)
    Depth Map (array of depth values)
  Stereo image
    Right Image (TIFF, BMP or JPEG format)
    Left Image (TIFF, BMP or JPEG format)
    Depth Map (array of depth values)
  Video
    MPEG compressed media (color) for RGB
    MPEG compressed media (grayscale) for IR
    Sequence of depth maps for each frame The Raw Image file can be a simple file format, for example an array of 16 bit values corresponding to each pixel in the sensor. Additional metadata is also supported. Examples of metadata include time of capture, camera identification or configuration, lens settings, exposure settings, location, other status information, etc.

The Processed image data contains color image, IR image and depth data that has been processed. These data may be converted into a conventional RGB format, a monochrome image file containing the IR information, and depth data represented by an array of pixels. This array may be compressed using JPEG in a lossless compression mode. One approach for metadata uses the same data structures available for the TIFF format, but possibly extended to include IR images and depth maps. For example, the metadata in the TIFF format may be extended to also include IR exposure time, IR aperture and/or IR flash. For depth maps, additional metadata can include the algorithm used to generate the depth map, the number of depth levels, the mapping of depth level to actual distance possibly also with a margin of error, and point spread functions for the imaging systems.

In one approach, each of these components can be viewed by a conventional image viewer. For the RGB image, a conventional RGB viewer will display a conventional RGB image. For the IR channel, the IR is displayed as a grayscale image. The depth map can be displayed as a grayscale image or using a heat map.

In the listing above, there are two types of depth maps. The first depth map is calculated only for edges in the image. Any area of the image that is not located close to an edge has no depth information and is stored with a 0 for the pixel. In the second type of depth map, a regularization algorithm has been applied to fill in the depth information between the edges. The depth information is captured as 16 bit values. The metadata in the file describes the mapping between depth level and the physical depth from the camera.

The Adjustable Image data is intended to be further processed. Typically, this further processing manipulates the image data using the depth information. Examples of further processing include refocusing the image or changing the point of focus in the image, relighting the image such that objects at a certain distance are lighted differently than objects at different distances, and sharpening or blurring the image. Metadata such as the point spread functions can be especially useful for further processing.

Video sequences can also be processed in this manner. One of the challenges with video is managing the focussing of the video. One approach to focussing of the video sequence can be achieved in post processing as follows:
  Select a frame from the video.
  Sharpen the image to create maximum depth of field.
  Select the object in the frame that should be the point of focus.
  Select the degree of blur for objects at other distances from the camera.
  Select a mode for the rest of the video sequence:
    Fixed focus mode—Focus depth for the images is kept constant. E.g. if the selected object is 2 m from the camera, objects at 2 m will be in focus for the video sequence.
    Tracking focus mode—The object is tracked through the subsequent frames, and the focus follows the object. The depth is measured for the object in each frame. This distance is then used to be the point of focus in the artificially refocused images.
Similar approaches can be taken for other functions such as relighting of the image.

Video can include conventional formats. In one approach, each of the RGB image, IR image and depth map can be encoded using an MPEG like scheme. This approach produces three video sequences synchronized to each other. Each video sequence could have its own frame rate, bit depth and spatial resolution. In one variation, instead of each video sequence having its own sequence of motion vectors, motion vectors may be shared between the video sequences. For example, motion vectors for the IR and depth map channels might be derived from the motion vectors for the RGB channel, or vice versa.

The availability of IR and depth information can also be used to enhance the video. For example, depth information may also be used to encode, compress or otherwise determine the format for the images. Normally video compression makes use of the comparison between different frames but does not make use of any depth information. Typically to compress a region of a frame, a search is made of a reference frame for a region that provides the best match. This region is used as the reference to regenerate the region in the existing frame. There is no attempt to account for changes in depth. However, depth map information may also provide an indication of how the surface or edges are moving in the z axis (i.e., toward or away from the camera). This information can be used to identify how the surface defined by the reference macroblock has changed. Effectively using depth information, the reference macroblock can be distorted to match how the macroblock would have changed as elements in the macroblock moved closer or further from the camera. In one approach, the reference frame or the frame of interest can be scaled for distance and then matched. After scaling, the reference is selected and the motion vectors are calculated.

In another approach, the depth information can be used to create a three-dimensional motion estimation vector which takes into account the movement of elements in three dimensions (x, y and z) as opposed to the two-dimensional techniques (only x and y) that are implemented in existing compression schemes such as MPEG or HEVC. Another approach is to use a two-dimensional motion estimation vector for visual frames and to use the depth map that has been computed for the image to create a distortion of the reference frame to best match the current frame being encoded.

The depth map itself can be compressed. The depth map can be compressed using conventional data compression techniques such as entropy encoding. Additional techniques that can be employed to compress the depth map include to transfer only edge information and use the interpolation techniques to fill in the flat surfaces or edge information with reference points in the object that have the depth information for the flat surfaces between edges.

Additionally the depth information can be compressed using lossy techniques such that the distortion of the depth map caused by the loss of information does not impact the visual perception of the viewer of the quality of the video sequence. For example, in a fast changing scene, the depth information may be encoded with more loss than in a scene with limited movement. The depth map may be encoded using motion estimation and making reference to a so called reference frame for which the depth has been absolutely encoded or generated from a previous reference frame.

With these approaches, the error between the reference frame and the current frame is reduced because distortion caused by the object moving closer or further from the camera is accounted for. This, in turn, increases the efficiency of the compression.

Although the detailed description contains many specifics, these should not be construed as limiting the scope of the invention but merely as illustrating different examples and aspects of the invention. It should be appreciated that the scope of the invention includes other embodiments not discussed in detail above. For example, the functions and features described above can be implemented without the use of an API. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, aspects of the invention are implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for compressing a video sequence of frames, the method implemented on a processor and comprising:
   accessing a video sequence of frames of visible images;
   accessing depth information corresponding to the frames;
   identifying corresponding macroblocks in different frames;
   scaling the corresponding macroblocks according to a difference in depth of the macroblocks;
   calculating motion vectors for the scaled corresponding macroblocks based on relative motion of the scaled corresponding macroblocks; and
   compressing the video sequence of frames of visible images, based in part on the calculated motion vectors.

2. The method of claim 1 further comprising:
   capturing the frames of visible images and capturing corresponding frames of infrared images, the visible and infrared image frames captured using different apertures; and
   processing captured frames of visible images and corresponding captured frames of infrared images, to generate the depth information.

3. The method of claim 1 wherein calculating motion vectors for the scaled corresponding macroblocks comprises:
  calculating three-dimensional motion vectors for the scaled corresponding macroblocks based on relative motion of the scaled corresponding macroblocks and differences in depth of the scaled corresponding macroblocks.

4. The method of claim 1 further comprising:
  compressing the depth information.

5. The method of claim 4 wherein compressing the depth information comprises:
  excluding depth information for image areas that are not edges.

6. The method of claim 5 wherein depth information for image areas that are not edges may be estimated by interpolating the depth information for edges.

7. The method of claim 4 wherein compressing the depth information comprises:
  applying a lossy compression to the depth information, wherein a loss in the compression increases for image areas with more motion.

8. The method of claim 4 wherein compressing the depth information comprises:
  including depth information for reference frames; and
  excluding depth information for frames between reference frames, wherein depth information for said frames may be estimated based on motion estimation relative to the reference frames.

9. A non-transitory computer-readable storage medium storing executable computer program instructions for compressing a video sequence of frames, the instructions executable by a processor and causing the processor to perform a method comprising
  accessing a video sequence of frames of visible images;
  accessing depth information corresponding to the frames;
  identifying corresponding macroblocks in different frames;
  scaling the corresponding macroblocks according to a difference in depth of the macroblocks;
  calculating motion vectors for the scaled corresponding macroblocks based on relative motion of the scaled corresponding macroblocks; and
  compressing the video sequence of frames of visible images, based in part on the calculated motion vectors.

10. The non-transitory computer-readable storage medium of claim 9, wherein the method further comprises:
  capturing the frames of visible images and capturing corresponding frames of infrared images, the visible and infrared image frames captured using different apertures; and
  processing captured frames of visible images and corresponding captured frames of infrared images, to generate the depth information.

11. The non-transitory computer-readable storage medium of claim 9 wherein calculating motion vectors for the scaled corresponding macroblocks comprises:
  calculating three-dimensional motion vectors for the scaled corresponding macroblocks based on relative motion of the scaled corresponding macroblocks and differences in depth of the scaled corresponding macroblocks.

12. The non-transitory computer-readable storage medium of claim 9, wherein the method further comprises:
  compressing the depth information.

13. The non-transitory computer-readable storage medium of claim 12 wherein compressing the depth information comprises:
  excluding depth information for image areas that are not edges.

14. The non-transitory computer-readable storage medium of claim 13 wherein depth information for image areas that are not edges may be estimated by interpolating the depth information for edges.

15. The non-transitory computer-readable storage medium of claim 12 wherein compressing the depth information comprises:
  applying a lossy compression to the depth information, wherein a loss in the compression increases for image areas with more motion.

16. The non-transitory computer-readable storage medium of claim 12 wherein compressing the depth information comprises:
  including depth information for reference frames; and
  excluding depth information for frames between reference frames, wherein depth information for said frames may be estimated based on motion estimation relative to the reference frames.

* * * * *